US010543496B2

(12) United States Patent
Vogt

(10) Patent No.: US 10,543,496 B2
(45) Date of Patent: Jan. 28, 2020

(54) MULTIFUNCTIONAL DISPENSING MECHANISM FOR FERTILIZER/SEED SPREADER APPARATUS

(71) Applicant: James Francis Vogt, Newburg, MO (US)

(72) Inventor: James Francis Vogt, Newburg, MO (US)

( * ) Notice: Subject to any disclaimer, the term of this patent is extended or adjusted under 35 U.S.C. 154(b) by 0 days.

(21) Appl. No.: 16/108,033

(22) Filed: Aug. 21, 2018

(65) Prior Publication Data
US 2019/0054482 A1 Feb. 21, 2019

Related U.S. Application Data

(60) Provisional application No. 62/548,164, filed on Aug. 21, 2017.

(51) Int. Cl.
B05B 7/14 (2006.01)
A01C 15/06 (2006.01)
A01K 5/02 (2006.01)
B65D 47/26 (2006.01)
B65D 47/28 (2006.01)
B65D 88/26 (2006.01)

(52) U.S. Cl.
CPC ............ B05B 7/1404 (2013.01); A01C 15/06 (2013.01); A01K 5/0225 (2013.01); B65D 47/26 (2013.01); B65D 47/286 (2013.01); B65D 88/26 (2013.01)

(58) Field of Classification Search
CPC .... B05B 7/1404; B65D 47/26; B65D 47/286; B65D 88/26; A01C 15/06; A01K 5/0225
See application file for complete search history.

(56) References Cited

U.S. PATENT DOCUMENTS

| 211,352 | A | * | 1/1879 | Smith | B67C 11/04 141/345 |
| 1,165,331 | A | * | 12/1915 | Gray | A01C 15/04 239/654 |
| 2,445,501 | A | * | 7/1948 | Vagim | B65D 90/582 222/459 |
| 2,582,207 | A | * | 1/1952 | Shaw | B65D 21/08 206/501 |
| 2,681,169 | A | * | 6/1954 | Watson | A47K 5/10 222/162 |
| 2,743,043 | A | * | 4/1956 | Hines, Sr. | A01C 15/00 222/311 |

(Continued)

Primary Examiner — Frederick C Nicolas
(74) Attorney, Agent, or Firm — Dunlap Bennett & Ludwig PLLC; Brendan E. Squire

(57) ABSTRACT

A hopper type agricultural and livestock spreader and fertilizer dispensing apparatus. The dispenser may be configured to be mounted to a ground transport vehicle, such as a tractor and three point hitch. An auxiliary outlet is configured in the hopper at an elevated position from a bottom end thereof. A flow regulator is operatively attached to regulate the outlet area of the auxiliary outlet to achieve a desired flow rate. The auxiliary outlet is dimensioned to permit the flow of large feed stocks. A dispenser flow tube may be operatively connected to the outlet to direct the flow of feed product in a desired spot. The flow tube may extend laterally from the side edges of the hopper to permit delivery of food product along the length of a livestock feed trough. A kit for modifying a hopper type fertilizer/feed dispenser.

20 Claims, 4 Drawing Sheets

(56) References Cited

U.S. PATENT DOCUMENTS

| | | | | |
|---|---|---|---|---|
| 3,371,826 A * | 3/1968 | Speno | ............... | E01B 27/022 |
| | | | | 105/240 |
| 3,616,969 A * | 11/1971 | Koizumi | ............... | G03G 15/09 |
| | | | | 222/161 |
| 3,744,677 A * | 7/1973 | Beall | ............... | B65D 88/56 |
| | | | | 222/162 |
| 4,136,762 A * | 1/1979 | Rosinbaum | ............... | B65D 90/587 |
| | | | | 193/34 |
| 4,545,446 A * | 10/1985 | Kokabu | ............... | G01G 13/18 |
| | | | | 105/282.2 |
| 4,619,379 A * | 10/1986 | Biehl | ............... | G07F 11/44 |
| | | | | 222/153.14 |
| 4,832,226 A * | 5/1989 | Leon | ............... | A47J 27/002 |
| | | | | 126/377.1 |
| 5,199,612 A * | 4/1993 | Raque | ............... | A21C 9/04 |
| | | | | 105/280 |
| 5,271,568 A * | 12/1993 | Stevie | ............... | A01C 15/02 |
| | | | | 222/317 |
| 5,529,219 A * | 6/1996 | Ward | ............... | A47K 5/1214 |
| | | | | 222/156 |
| 5,647,508 A * | 7/1997 | Ronci | ............... | A47F 1/03 |
| | | | | 211/74 |
| 6,145,705 A * | 11/2000 | Wallace | ............... | A47G 19/34 |
| | | | | 222/160 |
| 6,367,661 B1 * | 4/2002 | Valente | ............... | A21C 5/006 |
| | | | | 222/181.2 |
| 6,435,381 B1 * | 8/2002 | Waldman | ............... | A47F 1/03 |
| | | | | 222/505 |
| 7,152,765 B1 * | 12/2006 | Midden | ............... | A23G 9/045 |
| | | | | 222/511 |
| 7,614,432 B2 * | 11/2009 | Shaw | ............... | B65B 39/001 |
| | | | | 141/345 |

* cited by examiner

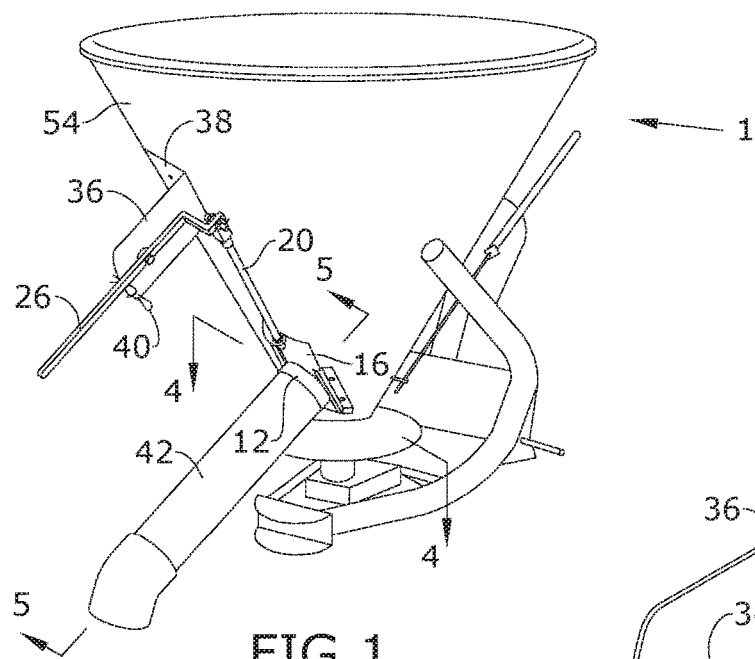
FIG.1
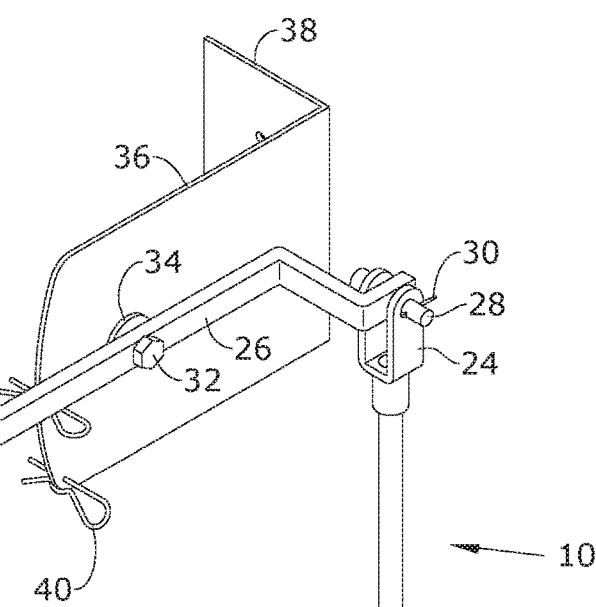
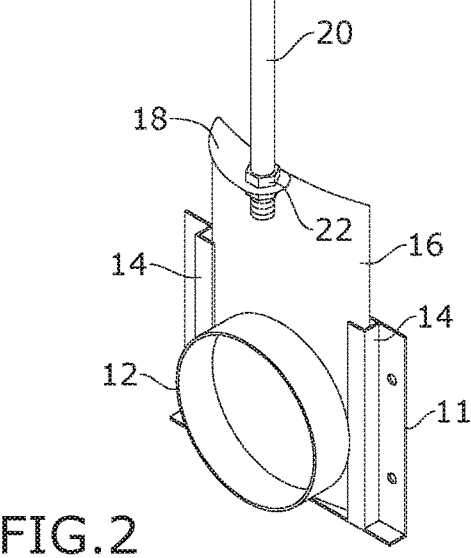
FIG.2

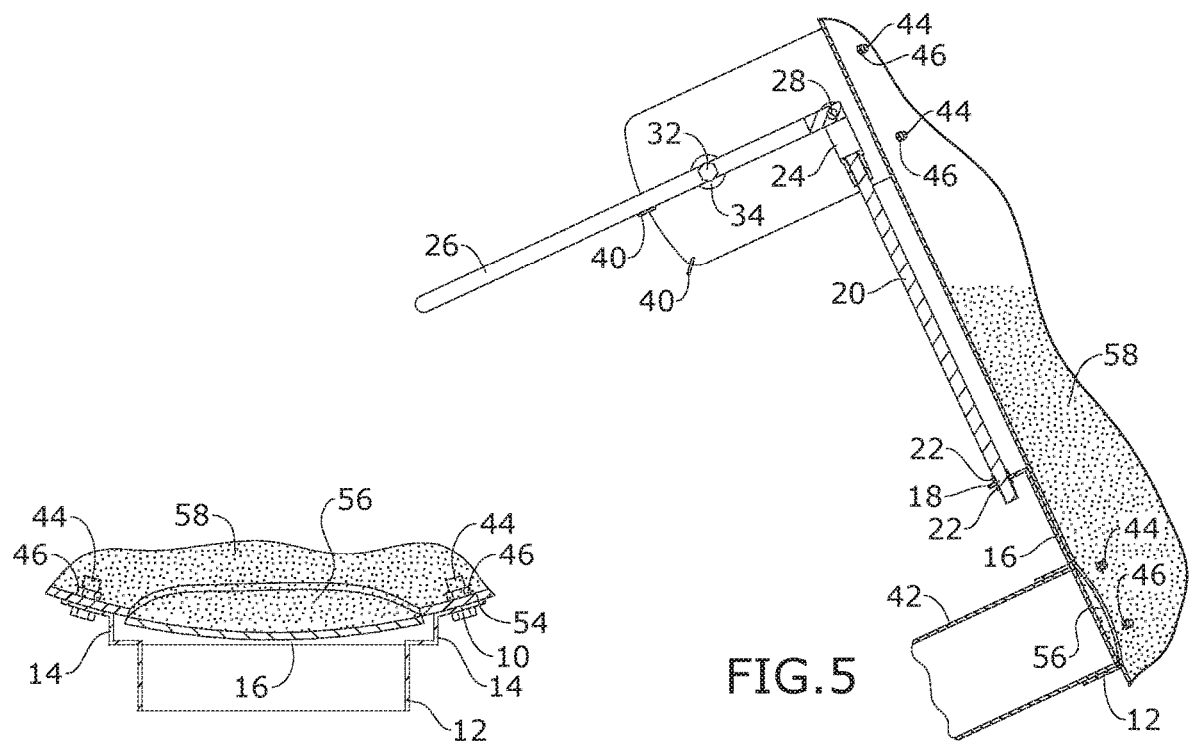
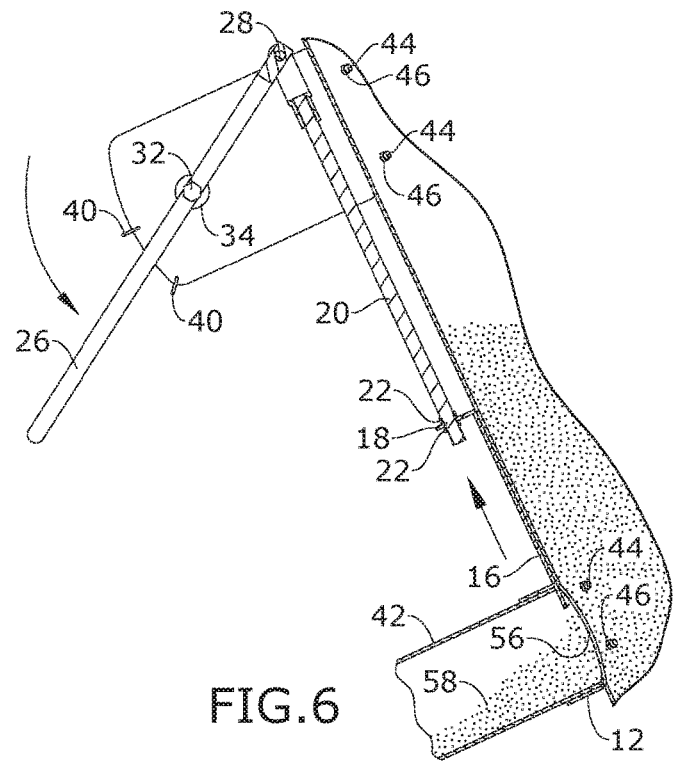

MULTIFUNCTIONAL DISPENSING MECHANISM FOR FERTILIZER/SEED SPREADER APPARATUS

CROSS-REFERENCE TO RELATED APPLICATION

This application claims the benefit of priority of U.S. provisional application No. 62/548,164 filed Aug. 21, 2017, the contents of which are herein incorporated by reference.

BACKGROUND OF THE INVENTION

The present invention relates to dispensing apparatus, and more particularly to hopper type agricultural and livestock fertilizer and seed dispensers. Current hopper type fertilizer/seed spreaders have small openings located near or at the bottom of the hopper, through which to dispense product. Thus, they are limited to dispensing only small, densely packed product such as fertilizer pellets, salt, and a limited variety of small seeds or feed products. Accordingly, they are generally relegated to a special use role for agricultural and livestock farming operations. This limits its use from being able to dispense larger varieties of product, such as feeds for larger livestock.

As can be seen, there is a need for an improved agricultural product dispenser to also dispense both lighter-weight product and larger product, such as larger, less dense varieties of seed and bulk animal feed.

SUMMARY OF THE INVENTION

In one aspect of the present invention a feed product dispenser is disclosed. The feed product dispenser includes a hopper having at least one sidewall defining an interior chamber. An outlet is defined in the at least one sidewall, and is elevated from a bottom end of the hopper. A dispenser regulator is attached to the hopper to selectively dispense the feed product via the outlet.

In some embodiments, the dispenser regulator may include a regulator bracket attached to the hopper. The regulator bracket has opposed guide rails disposed on opposite sides of the outlet. A regulator slide is received within the guide rails. An operating mechanism is operable to selectively position the regulator slide between an open position and a closed position.

The operating mechanism may include a regulator handle having an operating end, a free end, and a pivot hole defined in an intermediate portion of the regulator handle proximal to the operating end. The regulator handle is attached to a hinge plate via a fastener permitting pivotal movement of the regulator handle about the fastener. A connecting rod is coupled to the operating end of the regulator handle. In other embodiments, the operating mechanism may include a hydraulic actuator to selectively position the regulator slide between the open position and the closed position. In other embodiments, the operating mechanism includes an electrical solenoid to selectively position the regulator slide between the open position and the closed position.

The hinge plate is attached to the at least one sidewall in an elevated position above the outlet. The outlet may be defined in an aft facing surface of the at least one sidewall. In other embodiments, the outlet is defined in a lateral side surface of the at least one sidewall.

In certain embodiments, an attachment ring is coupled to the dispenser regulator and a flow tube is coupled to the attachment ring. The flow tube is dimensioned to convey the feed product for dispensing in a close grouping. The flow tube may be oriented for a downward dispensing of the feed product behind a direction of travel of the feed product dispenser across a ground surface. Alternatively, the flow tube may extend laterally from the feed product dispenser to dispense the feed product adjacent to a direction of travel of the feed product dispenser across a ground surface.

Other aspects of the invention include a method of adapting a hopper seeder to dispense a feed product. The method includes defining an outlet in a lateral sidewall of the hopper, with the outlet defined at an elevated position from a bottom of the hopper. A regulator bracket is attached to the hopper around the outlet hole. A regulator plate is inserted in a guide rail of the regulator bracket. An operating mechanism is attached to the regulator plate, such that the operating mechanism is operable to selectively position the regulator plate to an open feed dispensing position.

In some embodiments, the operating mechanism includes a hinge plate attached to the lateral sidewall of the hopper, a regulator handle pivotally coupled to the hinge plate, and a connecting rod interconnecting an operating end of the regulator handle and the regulator plate.

The method may also include a attaching a flow tube to the regulator bracket. The flow tube may be directed in a downward position behind the hopper. Alternatively, the flow tube may be directed to a lateral side of the hopper.

The method may also include the steps of filling the hopper with the feed product and selectively operating the operating mechanism to dispense the feed product.

These and other features, aspects and advantages of the present invention will become better understood with reference to the following drawings, description and claims.

BRIEF DESCRIPTION OF THE DRAWINGS

FIG. 1 is a perspective view of the multifunctional dispensing mechanism, shown in an exemplary installation on a conical seeder;

FIG. 2 is a perspective view of the multifunctional dispensing mechanism;

FIG. 4 is a section view of the multifunctional dispensing mechanism, taken along line 4-4 in FIG. 1;

FIG. 5 is a section view of the multifunctional dispensing mechanism, taken along line 5-5 in FIG. 1;

FIG. 6 is a section view of the multifunctional dispensing mechanism, illustrating the movement of handle 26 to lift slide 16, releasing material 58;

DETAILED DESCRIPTION OF THE INVENTION

Figure 3:
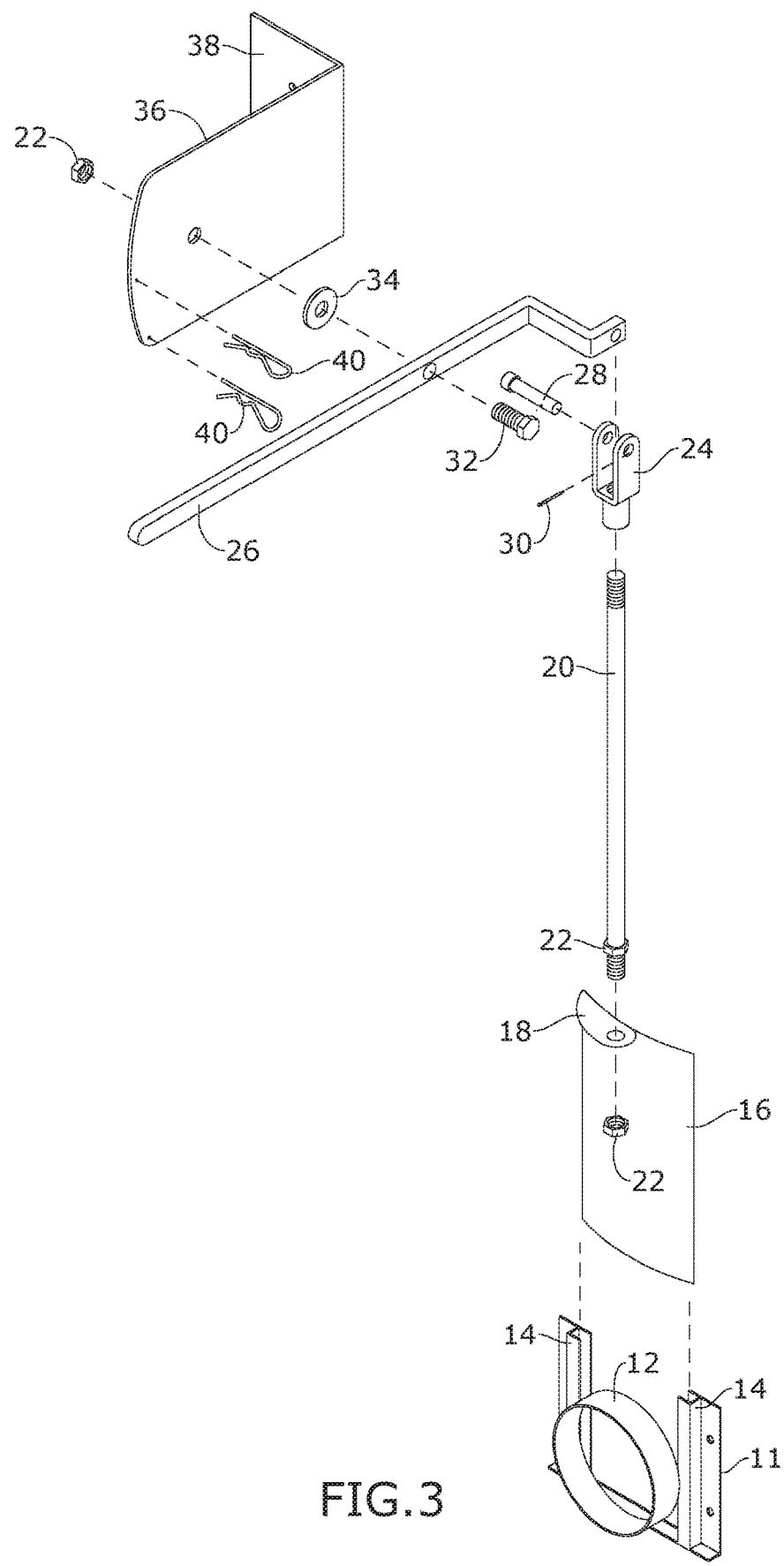
FIG. 3 is an exploded view of the multifunctional dispensing mechanism.
Figure 7:
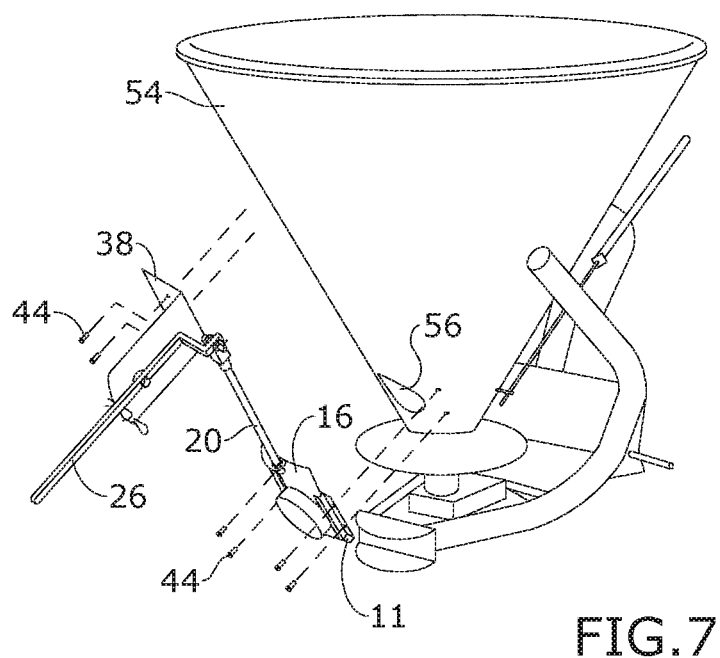
FIG. 7 is an exploded view of the invention, illustrating its multifunctional dispensing mechanism to exemplary spreader 54.
Figure 8:
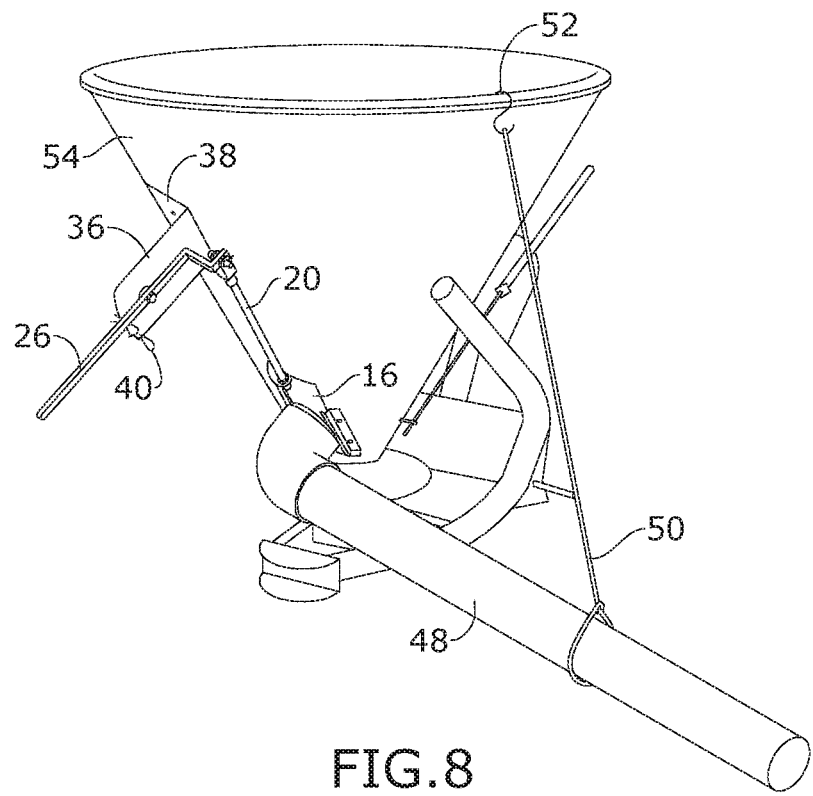
FIG. 8 is a perspective view of the multifunctional dispensing mechanism, shown with long flow attachment 48.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provides a multi-purpose dispenser apparatus 1 for agricultural and livestock farming operations. The dispenser apparatus 1 can accommodate larger output and is configurable to deliver product at elevated location on a hopper 54, which allows for much greater versatility in the type of product 58 that a standard hopper 54, such as cone shaped fertilizer/seed spreaders, are able to dispense.

The multi-purpose dispenser apparatus 1 eliminates the need for multiple pieces of equipment because it allows for dispensing not only small dense materials 58, such as fertilizer, salt and small grass seed, but also accommodates for dispensing larger types of seed of varying textures, as well as dispensing bulk or pelletized animal feed. Aspects of the present invention may include a dispenser apparatus 1, or a kit for modification of a dispenser apparatus.

As seen in reference to FIG. 1, a hopper type dispensing apparatus 1 according to aspects of the present invention is illustrated. The dispensing apparatus 1 may be carried on a ground transport vehicle. In the embodiment shown, the dispensing apparatus 1 may be mounted on a tractor via a conventional three-point hitch. The dispensing apparatus 1 includes a generally cylindrical conic hopper 54 for containing a desired quantity of delivery product 58 for dispensing in a farming operation. The delivery product 58 may include, granular or pelletized fertilizers, salts, seed, or animal feed product.

The hopper 54 has an opening at a top end for receiving the delivery product 58. A bottom end of the hopper 54 may include converging sidewalls to direct the delivery product 58 to an outlet 56 of the hopper 54.

Flow of the delivery product 58 through the outlet 54 is controlled via a dispenser regulator 10. The dispenser regulator 10 includes a regulator slide 16, configured as a plate that is operable via a regulator lever 26 and a mechanical linkage 20 means to selectively open and close the regulator slide 16 to control the area of the outlet 56 through which the delivery product 58 will flow.

For a kit configuration, a mounting template may be made from a sheet of paper, however, it can be made of other materials such as cardboard, even perhaps plastic or metal. It is utilized to mark the hopper 54 to cut an outlet 56 through a sidewall of the hopper 54.

The regulator slide 16 may be made of metal and approximately 8 inches long. However, the length could vary according to the needs of the delivery product 58 and dimensions of the outlet 56 area. Also, it could be made of a stamped or molded piece of plastic such as polyethylene or a similar durable material.

The regulator slide 16 is movably carried in a regulator bracket 11 that is attached to the hopper 54 surrounding the outlet 56. The regulator bracket 11 has opposed guide rails 14 on either side of the opening that receive side edges of the regulator slide 16. The regulator bracket 11 is also configured with a bracket ring 12 for connection to a delivery tube 48.

A control rod 20 may be made of metal and measures approximately 14 inches long. The length could vary as it can be adjusted on the regulator slide 16, using nuts 22 just below and just above an attachment bracket 18 protruding from the regulator slide 16 the control rod 20 connects to regulator slide 16. The control rod 20 may be threaded. Alternatively, it could have holes at the bottom and use pins to attach to regulator slide 16.

The control rod 20 is connected to a regulator handle 26 this is preferably made of metal. The control rod 20 is coupled to an operating end of the regulator handle 26, such as via a clevis 24, retaining pin 28, and cotter pin 30. The clevis 24 may be made of a threaded metal and measure approximately 3 inches long. The clevis 24 does not need to be threaded as it could be welded to a control rod 20 that isn't threaded. It could also attach to a control rod 20 that simply has threading on each end. Alternatively, it could be eliminated entirely by using a rod shaped with a 90 degree angle and a cotter key. There are many variations that can achieve the end goal.

The regulator handle 26 is coupled to a hinge plate 36 via fasteners such as a nut 22, washer 34 and a bolt 32, with the bolt 32 extending through a pivot hole of the regulator handle 26, providing a mechanical advantage to the regulator handle 26 to move the regulator slide 16. An attachment flange 38 extends from the hinge plate 36 to provide for mounting of the attachment plate 36 to the hopper 54. As will be appreciated, the regulator handle 26 and control rod 20 linkages could be extended so that it is able to be operated from a seat of a tractor. In some embodiments, the regulator handle 26, and or control rod 20 may be operated by activation of a solenoid or an actuator.

The attachment plate 26 may include a regulator handle stop, which may be provided by pins 40 extending through the attachment plate 26 and positioned to retain the regulator handle 26 in a fixed position.

In some embodiments, a short flow tube 42 is configured for attachment to the bracket ring 12. The short flow tube 42 may be provided with 45 degree elbow made about 18 inches long, but could vary in length. It may be made from a (4" diameter) plastic drainpipe but could also be made from metal pipe. A long flow tube 48 may be connected to the short flow tube 42 attachment with 45 degree elbow fitting may be made about 48 inches long but could vary in length depending on the size of the tractor being used. The long flow tube 42 is positioned for side delivery of animal feed 58 into bunk feeders/troughs.

As will be appreciated from the present disclosure, if the outlet 56 and a dispenser regulator 10 are mounted to a side facing surface of the hopper 54, the long flow tube 48 may be connected directly to the bracket ring 12 to achieve side dispensing of the feed product 58.

The dispenser apparatus 10 may utilize the agitator mechanism of a standard hopper fertilizer/seed spreader but allows for dispensing of product 578 that would otherwise clog or jam a standard spreaders output apparatus. The regulator bracket 11 with bracket ring 12 gets mounted to the hopper sidewall in an elevated location and is placed over the outlet hole 56 that is defined in the sidewall of the hopper 54, thus creating a second outlet for the apparatus. The regulator slide 16 is inserted into the guide rails 14 of the regulator bracket 11. The regulator slide 16 is operable to move up and down behind the ring 12, allowing regulation to increase or decrease the flow of product 58 carried through the outlet 54.

The regulator slide 16 is operated by attaching the regulator slide 16 to the control rod 20. The control rod 20 is then attached to the clevis, which in turn gets attached to a regulator handle 26. The regulator handle 26 is then secured onto a 90 degree hinge plate 36 that is affixed to the hopper 54. The regulator handle 26 then operates the slide plate16 for controlling the rate of flow of the product 58. By adding an additional output apparatus that is larger in size, the dispenser 10 can now dispense a larger variety of seed, as well as bulk animal feed, such as nutritional protein cubes for cattle.

By adding the additional larger area output apparatus and elevating the mechanism, relative to the bottom of the hopper 54, the dispenser is able to dispense animal feed 58 through the flow tubes 42, 48. The elevation of the mechanism creates enough vertical clearance to dispense animal feed through the flow tubes 48. The flow tubes 48 connect to the ring 12 and then allow for precise placement of the animal feed in a row or a feed trough.

The short flow tube 42 with a 45 degree elbow may be utilized to lay a straight line of feed onto the ground aft of the transport vehicle. Keeping the feed placement narrow and straight, which prevents waste by reducing the likelihood of cattle stomping widely dispersed excess feed into the ground while feeding (when the feed is laid in a wider swath/less precise fashion). The long flow tube 42 with a 45 degree elbow funnels is used to deliver the feed 58 into troughs, making for an incredibly simple and efficient way to fill the trough.

When assembling a kit of the invention to modify an existing hopper dispenser 54, the regulator bracket 11 with ring 12 is attached to a lateral sidewall of the hopper 54. By way of non limiting example, may be placed approximately 25 inches upward from the bottom center portion of regulator bracket 11 with ring 12. Then measure over approximately 2-3 inches to the right of that point. The location of the installation of the 90 degree hinge plate 36 may vary slightly.

When utilizing the invention to dispense various types of seed (such as warm-season grass seed which is very lightweight or perhaps a Virginia rye seed, which is a very coarse, bearded seed), the farmer may combine a selected ratio of sand or fertilizer with the seed, depending on the size and weight of the seed. This combination would allow for optimal flow through the dispenser when dispensing the product. The existing output apparatus of the standard outlet of the fertilizer/seed spreader would be closed so the product 58 would then be dispensed from the output apparatus of the invention. The product 58 would fall down onto the standard (cone shaped) fertilizer/seed spreader's existing broadcast spinner utilizing it's vanes to disperse the product in an even circular swath along the ground.

When choosing to dispense bulk animal feed 58 utilizing the invention, the existing output apparatus of the standard hopper fertilizer/seed spreader would be closed so the product 58 would then be dispensed from the output 56 apparatus of the invention. One would remove the broadcast spinner from the spreader's existing spinner. This would prevent the vanes from interfering with the flow tube 42, 48 attachments used with dispensing the bulk animal feed 58.

When choosing to dispense the animal feed 58 in a straight line, onto the ground, the farmer would utilize the short flow tube 42. When choosing to dispense the animal feed into troughs the farmer would utilize the long flow tube 48. The dispensing regulator 10 of the present invention may also include a plurality of attachment accessories, for use with dispensing animal feed. A short flow tube attachment with 45 degree elbow 16 connects to the ring on regulator bracket 14.

The hopper 54 may also include addition of a secure lid, which would protect any product 58 that is being dispensed from nature's elements (rain, sleet, snow, etc.) while it is being dispensed or carried in the hopper 54. It would be advantageous to have a clear lid or window in the lid in order to gauge how much product 58 remains in the hopper 54.

As will be appreciated, there are many fertilizer/seed spreaders made throughout the world. None of these have the ability to be utilized for feeding cattle, horses or herds of other variations. People living on farms or ranches that have livestock, could greatly benefit from being able to use a hopper fertilizer/seed spreader adapted with the present invention. The machine would serve a multitude of purposes for such people, simplifying their lives. Also, feeding livestock can be extremely difficult for the older population due to the heavy lifting of bulk animal feed.

It should be understood, of course, that the foregoing relates to exemplary embodiments of the invention and that modifications may be made without departing from the spirit and scope of the invention as set forth in the following claims.

What is claimed is:

1. A feed product dispenser, comprising:
   a hopper having at least one sidewall defining an interior chamber;
   an outlet defined in the at least one sidewall, elevated from a bottom end of the hopper; and
   a dispenser regulator attached to the hopper to selectively dispense the feed product via the outlet the dispenser regulator further comprising:
   a regulator bracket attached to the hopper, the regulator bracket having opposed guide rails disposed on opposite sides of the outlet;
   a regulator slide received within the guide rails; and
   an operating mechanism, operable to selectively position the regulator slide between an open position and a closed position.

2. The feed product dispenser of claim 1, wherein the operating mechanism comprises:
   a regulator handle having an operating end, a free end, and a pivot hole defined in an intermediate portion of the regulator handle proximal to the operating end, the regulator handle attached to a hinge plate via a fastener permitting pivotal movement of the regulator handle about the fastener; and
   a connecting rod coupled to the operating end of the regulator handle.

3. The feed product dispenser of claim 1, wherein the operating mechanism comprises:
   a hydraulic actuator to selectively position the regulator slide between the open position and the closed position.

4. The feed product dispenser of claim 1, wherein the operating mechanism comprises:
   an electrical solenoid to selectively position the regulator slide between the open position and the closed position.

5. The feed product dispenser of claim 2, wherein the hinge plate is attached to the at least one sidewall in an elevated position above the outlet.

6. The feed product dispenser of claim 1, wherein the outlet is defined in an aft facing surface of the at least one sidewall.

7. The feed product dispenser of claim 1, wherein the outlet is defined in a lateral side surface of the at least one sidewall.

8. The feed product dispenser of claim 1, further comprising:
   a flow tube operatively coupled to the dispenser regulator, the flow tube dimensioned to convey the feed product for dispensing in a close grouping.

9. The feed product dispenser of claim 1, wherein a flow tube is coupled to the dispenser regulator for one or more of a downward and a lateral dispensing of the feed product relative to a direction of travel of the feed product dispenser across a ground surface.

10. A feed product dispenser comprising:
    a hopper having at least one sidewall defining an interior chamber;
    an outlet defined in the at least one sidewall, elevated from a bottom end of the hopper;

a dispenser regulator attached to the hopper to selectively dispense the feed product via the outlet;

an attachment ring coupled to the dispenser regulator; and a flow tube coupled to the attachment ring, the flow tube dimensioned to convey the feed product for dispensing in a close grouping.

11. The feed product dispenser of claim 10, wherein the flow tube is oriented for a downward dispensing of the feed product behind a direction of travel of the feed product dispenser across a ground surface.

12. The feed product dispenser of claim 10, wherein the flow tube extends laterally from the feed product dispenser to dispense the feed product adjacent to a direction of travel of the feed product dispenser across a ground surface.

13. The feed product dispenser of claim 10, the dispenser regulator further comprising:

a regulator bracket attached to the hopper, the regulator bracket having opposed guide rails disposed on opposite sides of the outlet;

a hydraulic actuator to selectively position a regulator slide, carried in the opposed guide rails, between an open position and a closed position.

14. The feed product dispenser of claim 10, further comprising:

an electrical solenoid to selectively position the dispenser regulator.

15. The feed product dispenser of claim 10, further comprising:

a hydraulic actuator to selectively position the dispenser regulator.

16. A method of adapting a hopper seeder to dispense a feed product, comprising:

defining an outlet in a lateral sidewall of the hopper, the outlet defined at an elevated position from a bottom of the hopper;

attaching a regulator bracket to the hopper around the outlet hole;

inserting a regulator plate in a guide rail of the regulator bracket; and attaching an operating mechanism to the regulator plate, the operating mechanism having a hinge plate attached to the lateral sidewall of the hopper, a regulator handle pivotally coupled to the hinge plate, and a connect rod interconnecting an operating end of the regulator handle and the regulator plate, the operating mechanism operable to selectively position the regulator plate to an open feed dispensing position.

17. The method of claim 16, further comprising:

an attaching a flow tube to the regulator bracket.

18. The method of claim 17, further comprising:

directing the flow tube in a downward position behind the hopper.

19. The method of claim 17, further comprising:

directing the flow tube to a lateral side of the hopper.

20. The method of claim 16, further comprising:

filling the hopper with the feed product; and selectively operating the operating mechanism to dispense the feed product.

* * * * *